United States Patent [19]

Roope

[11] Patent Number: 4,523,823
[45] Date of Patent: Jun. 18, 1985

[54] LIGHT BLOCKING PANEL FOR OVERHEAD PROJECTORS

[76] Inventor: Mary E. F. Roope, 14547 Farmcrest Pl., Colesville, Md. 20904

[21] Appl. No.: 596,917

[22] Filed: Apr. 5, 1984

[51] Int. Cl.³ .............................................. G03B 21/14
[52] U.S. Cl. ...................................... 353/97; 353/122
[58] Field of Search ............... 353/97, 122, DIG. 1-6, 353/89, 119; 362/351, 359; 350/587; 16/DIG. 13; D16/24, 26; 434/331, 348, 365

[56] References Cited

U.S. PATENT DOCUMENTS

| 1,762,801 | 6/1930 | Strong | 353/89 |
| 2,669,156 | 2/1954 | Fitzgerald | 353/97 |
| 3,611,896 | 10/1971 | Aoki | 350/587 |
| 4,163,303 | 8/1979 | Hanna | 16/DIG. 13 |
| 4,327,960 | 5/1982 | Gould | 350/587 |

FOREIGN PATENT DOCUMENTS 1434514  5/1976  United Kingdom ............... 350/587

*Primary Examiner*—Charles Frankfort
*Assistant Examiner*—Thomas B. Will
*Attorney, Agent, or Firm*—B. P. Fishburne, Jr.

[57] ABSTRACT

The elevated projection head of a conventional overhead projector is equipped with a flip panel of opaque material which, in a free-hanging vertical position, blocks light from the projection head and, in a raised position, is clear of the projected light path. The flip panel is attached to the projection head by a free-flexing hinge element to facilitate flipping the panel between its two positions of use. During presentations made with use of the overhead projector, the necessity for turning the projector off and on during brief interruptions of the presentations or while changing transparencies is eliminated. The structure of the projection head need not be altered to accept the flip panel attachment.

4 Claims, 2 Drawing Figures

LIGHT BLOCKING PANEL FOR OVERHEAD PROJECTORS

BACKGROUND OF THE INVENTION

Overhead projectors of the type shown in U.S. Pat. No. 3,979,160 and U.S. Pat. No. Des. 244,602 are widely used in making various types of visual presentations concerned with business matters, economics and a wide variety of educational disciplines. The presenter stands near one side of the overhead projector and places a series of transparencies on the top transparent stage of the light box forming the base of the projector. Images carried by the transparencies are reflected by the elevated projection head through its lenses and mirror onto a suitable remote projection screen.

It is customary for a presenter to interrupt the visual presentation periodically, to make comments and answer questions and the like. Such periods of interruption are usually accompanied by turning off the projector, followed by turning it back on following the interruption. This is somewhat inconvenient for the presenter as well as for the audience. The audience becomes accustomed to a humming sound from the projector and the frequent turning off and on of the projector during a presentation can in itself be annoying, tending to interfere with concentration.

To deal with the above simple problem, which heretofore has not been solved in a convenient and economical way, a simple projected light blocking flip panel attachment according to the invention is provided on the elevated projection head which can be conveniently operated between two positions of use by the presenter when it is desired to briefly interrupt a presentation for any of the mentioned reasons.

In one position, the panel hangs freely by gravity in front of the lens of the projection head to block or interrupt the light being projected onto a remote screen. In the second position of use, the panel is flipped up on its flexible hinge to assume an elevated non-light blocking position on the projection head, either horizontal or inclined. The panel attachment is easily operated by a flick of the finger, is lightweight and durable. It can be formed of opaque plastics and attached to the projection head without defacing or in any way structurally altering the same.

For example, a flexible hinge strip can be provided on the flip panel having conventional minute hook and loop pile components, one of which can be adhesively secured to a surface of the projection head.

The cost of the attachment is minimal, rendering the device ideally suited as a "give away" to customers of manufacturers of the projectors. If desired, the flip panel may be included as an improvement feature on new projectors. Extreme simplicity and convenience of use are inherent in the invention.

The use of the invention allows the presenter to run the projector continuously, without turning it off and on during interruptions in the presentation. The device does not interfere in the slightest with normal usage of the overhead projector, and if its use is not desired, the device can simply remain in the inactive flipped-up position.

Other objects and advantages of the invention will become apparent to those skilled in the art during the course of the following description.

DETAILED DESCRIPTION

Figure 1:
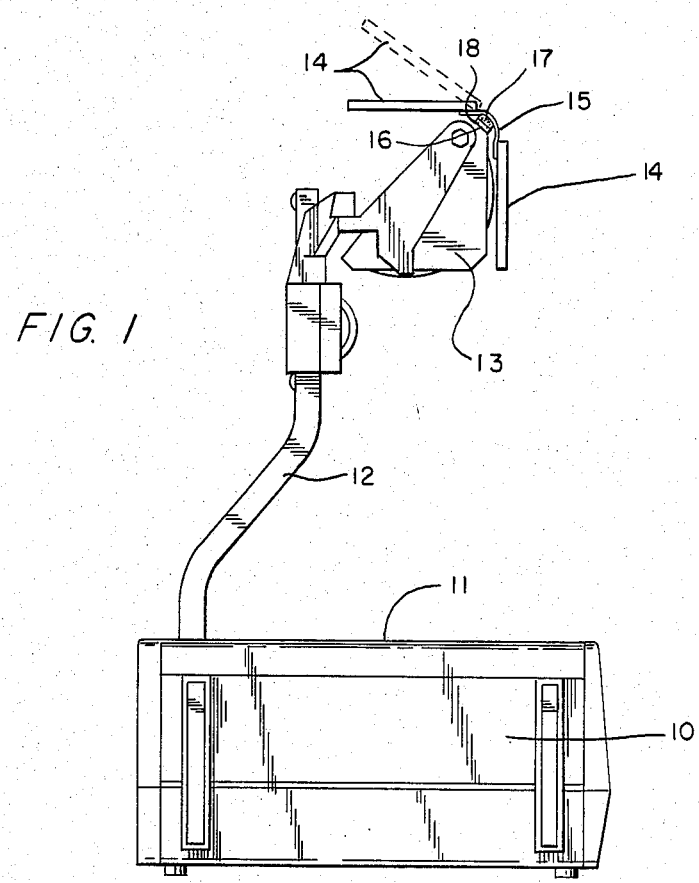
FIG. 1 is a side elevation of a projected light blocking flip panel attachment for an overhead projector according to the invention.
Figure 2:
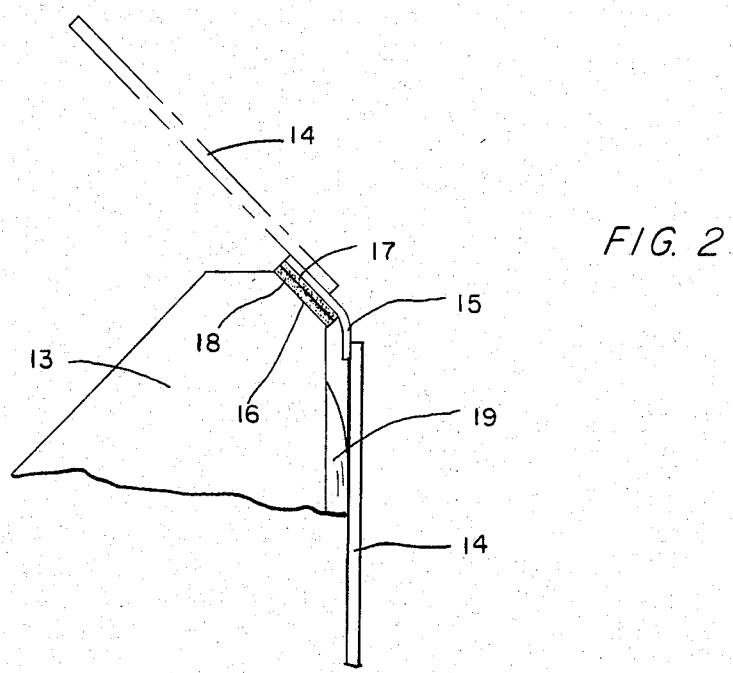
FIG. 2 is an enlarged side elevation of the flip panel attachment in association with a projection head.

Referring to the drawings in detail wherein like numerals designate like parts, a conventional overhead projector of the type shown in U.S. Pat. No. Des. 244,602 comprises a light box 10 forming a base for the projector and having a top horizontal transparent stage 11 on which demonstration transparencies are placed. A support post 12 rises from the rear of the base 10 and mounts an elevated projection head 13 which has the ability to project a transparency image forwardly onto a display screen, not shown in the drawings. The overhead projector is entirely conventional and its details need not be further described herein for a full understanding of the invention.

To obviate the necessity for turning the projector off and an interrmittently during inevitable interruptions in a presentation, as previously explained, a light blocking flip panel 14 formed of opaque plastics or other suitable material is provided as an attachment on the projection head 13. Preferably, a highly flexible hinge strip 15 carried by the top edge of the panel 14 is attached to an existing flat surface 16 of the projection head 13 by a pair of mutually coacting minute hook and loop pile strips or components 17 and 18. Such coacting fastener components are widely manufactured and sold under the trademark "VELCRO". Any equivalent fastener means can be employed.

The component 18 can be attached to the projection head surface 16 adhesively to avoid marring the projector head. No mechanical-type fastener elements are required. The other component 17 secured to the hinge strip 15 is merely pressed into engagement with the component or strip 18 to form a very secure, although separable, connection, as is well known.

In use, when the panel 14 hangs freely in front of the projection head lens 19, projected light is blocked and cannot reach the screen. The presenter places the panel 14 in this position whenever he or she wishes to interrupt the presentation and block the bright light from reaching the screen, without the need for turning off and on the projector.

When the interruption is over and it is desired to continue with the presentation, the panel 14 is simply flipped up with the finger to the inactive non-light blocking position above the projection head 13, which position may be horizontal and rearwardly extending or upwardly inclined, as shown in the drawings, depending upon the formation of the flexible hinge strip 15.

The many advantages possessed by the light blocking flip panel according to the invention should be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In an overhead projector of the type having an elevated projection head including a forward projection lens and a light box below the projection head having a top horizontal transparent stage on which transparencies are placed, the combination with said projection head of a gravity responsive opaque panel of a size and shape to substantially cover the front of said projection head and said lens when in a free-hanging vertical position, and a flexible hinge means interconnecting the opaque panel and projection head whereby a user of the overhead projector can manually flip the opaque panel from its free-hanging vertical position in front of the projection lens to an elevated inactive position of the panel away from the front of the lens where the panel will again be held stationary by the influence of gravity.

2. In an overhead projector as defined in claim 1, and said flexible hinge means including a strip of flexible material secured to the panel and mating separable hook and loop pile components attached to the flexible strip and to a surface on the projection head near its top and above said projection lens.

3. A light blocking opaque panel attachment for overhead projectors comprising an opaque panel body adapted in a free-hanging vertical position under the influence of gravity to substantially cover the front of the projection head of said overhead projector and block light projected therefrom, and a highly flexible hinge strip bodily carrying the opaque panel body and being adapted for attachment to a surface of the projection head near the top of such head, whereby the opaque panel can be readily flipped by finger action from its active free-hanging vertical position in front of the projection head to a generally horizontal non-use position at the top of the projection head where it will remain solely due to the action of gravity.

4. A light blocking opaque panel attachment for overhead projectors as defined in claim 3, and said hinge strip being detachably secured to said surface of the projection head by a pair of mating hook and loop pile components one on said surface and the other on said strip.

* * * * *